United States Patent
Best

(10) Patent No.: US 10,264,051 B2
(45) Date of Patent: Apr. 16, 2019

(54) METHOD AND SYSTEM FOR REPLICATING A COMMUNICATION APPLICATION ON AN AUXILIARY COMPUTING DEVICE

(71) Applicant: KIK INTERACTIVE INC., Waterloo (CA)

(72) Inventor: Christopher Best, Waterloo (CA)

(73) Assignee: KIK INTERACTIVE INC., Waterloo (CA)

(*) Notice: Subject to any disclaimer, the term of this patent is extended or adjusted under 35 U.S.C. 154(b) by 0 days.

(21) Appl. No.: 15/993,873

(22) Filed: May 31, 2018

(65) Prior Publication Data

US 2018/0278672 A1    Sep. 27, 2018

Related U.S. Application Data

(62) Division of application No. 15/115,130, filed as application No. PCT/CA2015/000069 on Feb. 6, 2015, now Pat. No. 10,015,227.

(Continued)

(51) Int. Cl.
*G06F 3/14* (2006.01)
*H04L 29/08* (2006.01)
(Continued)

(52) U.S. Cl.
CPC ............ *H04L 67/02* (2013.01); *G06F 3/1454* (2013.01); *G06K 19/06037* (2013.01);
(Continued)

(58) Field of Classification Search
CPC ......... H04L 67/10; H04L 67/34; H04L 67/02; H04L 67/1095; H04L 63/20; H04L 2012/2841; H04L 67/104; H04L 67/2814; G06F 3/0482; H04W 12/06; H04W 4/001; H04W 76/02; H04W 76/021; H04M 15/765
(Continued)

(56) References Cited

U.S. PATENT DOCUMENTS

| 2011/0088089 A1* | 4/2011 | MacDonald | H04L 63/102 726/13 |
| 2013/0221083 A1* | 8/2013 | Doss | H04W 12/04 235/375 |

(Continued)

*Primary Examiner* — Allahyar Kasraian
(74) *Attorney, Agent, or Firm* — Perry + Currier Inc.

(57) ABSTRACT

According to embodiments described in the specification, a method and system for replicating an application on an auxiliary computing device are provided. The system includes the auxiliary computing device, a mobile computing device executing the application, and at least one server. The server provides the auxiliary computing device with a web application, and the auxiliary computing device presents a code generated using the web application on its display. The mobile computing device captures the code, and uses the code to establish a connection with the auxiliary computing device via the server. The server then routes data between the auxiliary computing device, the mobile computing device and other devices. The data includes application control data, which is routed between the mobile computing device and the auxiliary computing device; and message data, which is routed between the mobile computing device and other devices.

14 Claims, 12 Drawing Sheets

Related U.S. Application Data

(60) Provisional application No. 61/937,046, filed on Feb. 7, 2014.

(51) Int. Cl.
| | |
|---|---|
| *H04W 4/00* | (2018.01) |
| *H04W 12/04* | (2009.01) |
| *H04W 12/06* | (2009.01) |
| *H04W 80/10* | (2009.01) |
| *H04L 29/06* | (2006.01) |
| *G06K 19/06* | (2006.01) |
| *H04W 4/21* | (2018.01) |
| *H04W 76/30* | (2018.01) |
| *H04W 76/10* | (2018.01) |
| *G06K 9/18* | (2006.01) |

(52) U.S. Cl.
CPC .............. *H04L 63/18* (2013.01); *H04L 67/10* (2013.01); *H04L 67/141* (2013.01); *H04W 4/00* (2013.01); *H04W 4/21* (2018.02); *H04W 12/04* (2013.01); *H04W 12/06* (2013.01); *H04W 76/10* (2018.02); *H04W 76/30* (2018.02); *H04W 80/10* (2013.01); *G06K 9/18* (2013.01); *H04L 2463/082* (2013.01)

(58) Field of Classification Search
USPC .......... 709/217–219; 715/733–747; 455/410, 455/411
See application file for complete search history.

(56) References Cited

U.S. PATENT DOCUMENTS

| | | | |
|---|---|---|---|
| 2014/0197232 A1* | 7/2014 | Birkler | G06F 21/313 |
| | | | 235/375 |
| 2014/0306863 A1* | 10/2014 | Moy | G06F 3/1423 |
| | | | 345/1.3 |
| 2015/0281340 A1* | 10/2015 | Lea | H04L 12/1818 |
| | | | 709/204 |

* cited by examiner

METHOD AND SYSTEM FOR REPLICATING A COMMUNICATION APPLICATION ON AN AUXILIARY COMPUTING DEVICE

CROSS-REFERENCE TO RELATED APPLICATION

The present application is a divisional of U.S. application Ser. No. 15/115,130, filed Jul. 28, 2016, which is national phase entry of PCT Application no. PCT/CA2015/000069, filed Feb. 6, 2015, which claims priority from U.S. Provisional Application Ser. No. 61/937,046, filed Feb. 7, 2014. The entire contents of each of the above-identified applications are incorporated herein by reference.

FIELD

The specification relates generally to communication applications, and specifically to a method and system for replicating a communication application on an auxiliary computing device.

BACKGROUND

Mobile computing devices, such as laptops, netbooks, tablets, smartphones and smart watches have, or are, becoming ubiquitous. Such devices have created a revolution in the way people communicate and exchange and use information. Presently, many people use multiple mobile computing devices to achieve their communication needs and it is not unusual for a user to have all of a smartphone (e.g. an Apple iPhone, Samsung Galaxy, etc.), a tablet (e.g. an Apple iPad, Google Nexus 7, etc.), a laptop computer and one or more non-mobile computing devices, such as a desktop computer which they use for various tasks throughout their day.

Users desire to access their data and information, as seamlessly as possible, from each computing device so that they can be connected irrespective of how that connection is achieved. One proposed solution to such seamless connectivity has been so called "cloud" computing, whereby all of the data relevant to a user is stored in an online storage "cloud" and the user can access and/or interact with that data via any connected computing device.

However, the present inventor has determined that problems and/or limitations exist with using such cloud-based solutions. One problem is that, while most computing devices provide an HTML browser through which a user can view HTML-compatible data stored in the cloud, each category of computing device typically has one or more types of data, such as data related to a specific application, which requires a particular application to interact with the data. For example, a user may utilize a messaging application on their smartphone, but the user is precluded from accessing and interacting with that data unless the relevant messaging application is also available for the other computing devices, such a tablet, they use.

It can also be the case that a desired application is not available on one or more categories of computing devices, i.e. the text messenger application may be available on a smartphone and tablet, but not on a desktop or laptop computer. Similarly, a desired application may be available only on computing devices executing a particular operating system (i.e. Apple's iOS or Google's Android).

Further, even if the desired application is available for the computing device the user wishes to employ, that application may not have been installed on that computing device when the user wishes to use it. Thus, the user is required to first obtain and install the application on the computing device (if permitted by the owner of the computing device) and to perhaps pay an additional licensing fee for the right to use the application.

Another undesired, but common, problem is that the same application implemented on different computing devices will often have different user interfaces, requiring a user to learn to interact with the application in different ways on different devices.

Also, in some cases where a desired application could be available for a computing device, it can be the case that the computing device being used does not have needed hardware capabilities to properly execute the functions of the application. For example, a text messenger application which employs SMS messaging, requires that the computing device be connected to a cellular telephone network. While a smartphone or tablet can have such capabilities, a desktop computer or laptop computer may not have such capabilities.

BRIEF DESCRIPTIONS OF THE DRAWINGS

Embodiments are described with reference to the following figures, in which.

DETAILED DESCRIPTION OF THE EMBODIMENTS

Figure 1:
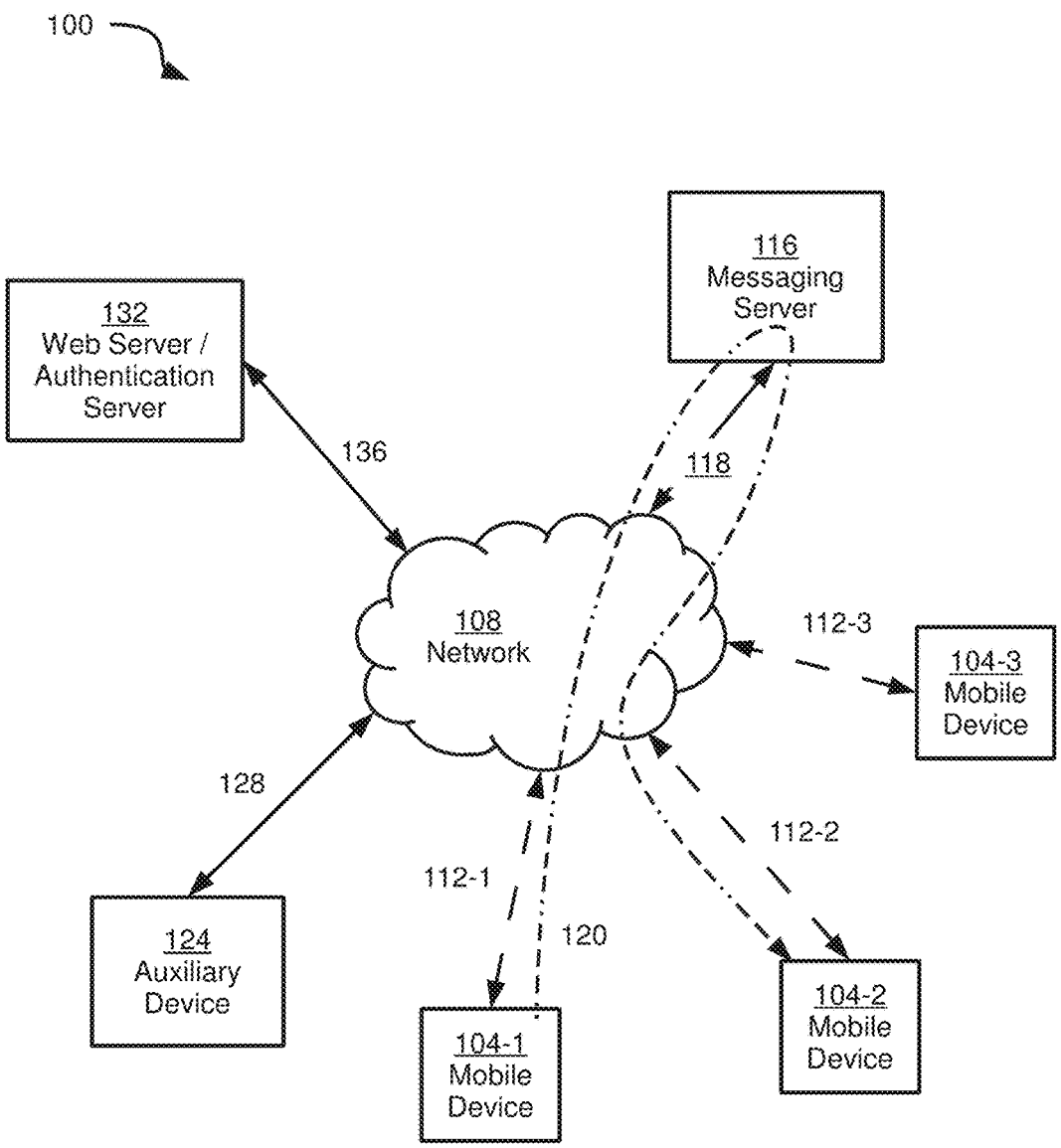
FIG. 1 depicts a communications system, according to a non-limiting embodiment.

FIG. 1 depicts a communications system 100. System 100 includes a plurality of mobile computing devices 104-1, 104-2 and 104-3 (referred to generically as a mobile computing device 104, and collectively as mobile computing devices 104). Additional mobile computing devices (not shown) can be included in system 100. Each mobile computing device 104 can be any of a cellular phone, a smart phone, a tablet computer, and the like.

Mobile computing devices 104-1, 104-2 and 104-3 are connected to a network 108 via respective links 112-1, 112-2 and 112-3, which are illustrated as wireless links but can also be wired links, or any suitable combination of wired and wireless links. Network 108 can include any suitable combination of wired and wireless networks, including but not limited to a Wide Area Network (WAN) such as the Internet, a Local Area Network (LAN) such as a corporate data network, cell phone networks, Wi-Fi networks, WiMax networks and the like.

Via network 108, mobile computing devices 104 can communicate with a messaging server 116 connected to network 108 via a link 118. Messaging server 116 executes a service or application that is of interest to the users of mobile computing devices 104. For example, mobile computing device 104-1 can execute a messaging application for sending and receiving messages to and from other mobile computing devices 104 executing the same messaging application. Such messages can include instant messages (e.g. Internet Protocol-based messages), Short Message Service (SMS) messages, Multimedia Messaging Service (MMS) messages and the like. In this example, mobile computing device 104-1 is configured to transmit a message addressed to an account associated with mobile computing device 104-2 to messaging server 116. Messaging server 116 stores associations between account names and unique identifiers of mobile computing devices 104 such as IP addresses, MAC addresses and the like. Messaging server 116 thus receives the message, looks up the unique identifier of the addressee (the addressee being the account associated with mobile computing device 104-2), and routes the message via network 108 to mobile computing device 104-2, as shown by message path 120.

System 100 also includes a plurality of additional computing devices, referred to herein as auxiliary computing devices. An example auxiliary computing device 124 is shown in FIG. 1; additional auxiliary computing devices (not shown) can also be included in system 100. Auxiliary computing device 124 is connected to network 108 via a link 128, which can be wired (as shown in FIG. 1), wireless, or any suitable combination of wired and wireless links.

Auxiliary computing device 124 can be a laptop computer, a desktop computer, a smart television or the like. In the following discussion, auxiliary computing device 124 is a desktop computer located at the workplace of the user of mobile computing device 104-1 (in other words, a workstation). Thus, auxiliary computing device 124 may provide superior inputs (in the form of ergonomically superior input devices) and outputs (in the form of a larger display and superior loudspeakers) than mobile computing device 104-1. The above characteristics of auxiliary computing device 124 are not required for the present invention, however: in other examples, auxiliary computing device 124 can have any of a wide variety of inputs and outputs, which may not be superior to those of mobile computing device 104-1.

It may be desirable in some circumstances to access the messaging functionality described above on auxiliary computing device 124. In the present example, auxiliary computing device 124 is a workstation and may therefore receive a greater share of the user's attention during certain time periods than mobile computing device 104-1. Other examples of circumstances in which it may be desirable to access messaging functionality, or other functionality provided by mobile computing device 104-1, on auxiliary computing device 124 will now occur to those skilled in the art.

System 100 is therefore configured to replicate the above-mentioned messaging application executed by mobile computing device 104-1 on auxiliary computing device 124. Replication, which will be discussed below in greater detail, provides substantially the same messaging functionality described above without requiring the user to alternate their attention between mobile computing device 104-1 and auxiliary computing device 124. Replication also provides messaging functionality without requiring auxiliary computing device 124 to execute the same messaging application, or even have the same hardware capabilities, as mobile computing device 104-1.

To assist in providing the replication mentioned above, system 100 also includes a web server and authentication server 132, also referred to herein as server 132 connected to network 108 via a link 136, which is illustrated as a wired link, but could also be a wireless link or a combination or wired and wireless links. Web/authentication server 132 establishes an association between mobile computing device 104-1 and auxiliary computing device 124. Once that association is established, messaging server 116 is configured to route certain communications between mobile computing device 104-1 and auxiliary computing device 124 in order to replicate the functionality of the messaging application executed by mobile computing device 104-1 on auxiliary computing device 124.

Figure 2:
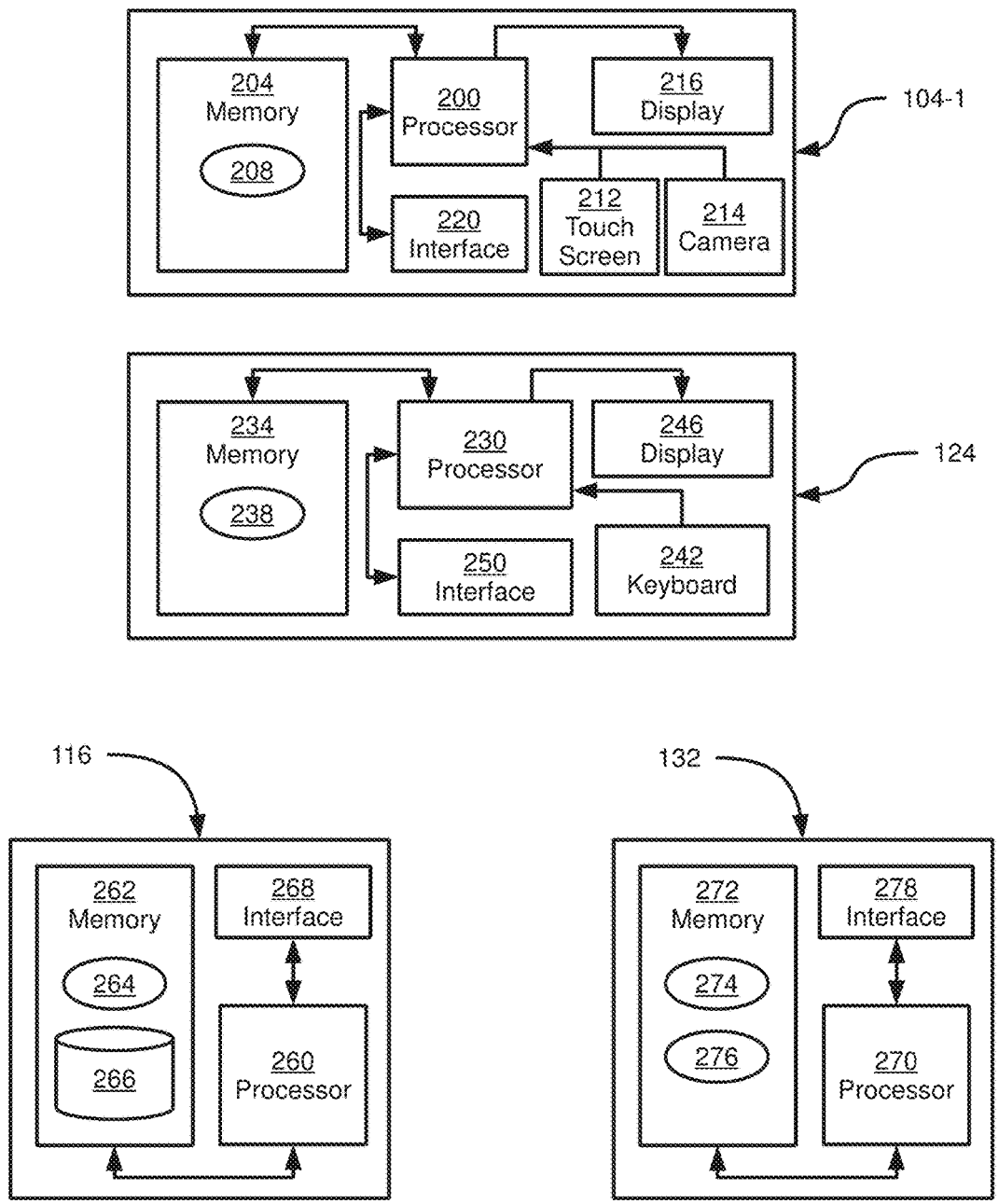
FIG. 2 depicts certain internal components of the devices of FIG. 1, according to a non-limiting embodiment.

Before a detailed discussion of the operation of system 100 is provided, certain components of mobile computing device 104-1, auxiliary computing device 124, messaging server 116 and server 132 will be described with reference to FIG. 2.

Mobile computing device 104-1 includes a processor 200 interconnected with a memory 204. Memory 204 stores computer readable instructions executable by processor 200, including a messaging application 208 as discussed earlier. When processor 200 executes the instructions of messaging application 208, mobile computing device 104-1 is configured to perform various functions related to exchanging messages with other mobile computing devices 104 and replicating messaging functions on auxiliary computing device 124.

Mobile computing device 104-1 also includes input devices interconnected with processor 200, in the form of a touch screen 212 and a camera 214. Mobile computing device 104-1 can also include other input devices, such as any suitable combination of a keypad, a microphone, a GPS receiver, and the like (not shown). Mobile computing device 104-1 also includes output devices interconnected with processor 200, including a display 216 integrated with touch screen 212. Other output devices can also be provided, such as a speaker (not shown). Mobile computing device 104-1 also includes a network interface 220 interconnected with processor 200, which allows mobile computing device 104-1 to connect to network 108 via link 112-1. Network interface 220 thus includes the necessary hardware, such as radio transmitter/receiver units, network interface controllers and the like, to communicate over link 112-1.

Auxiliary computing device 124 includes a processor 230 interconnected with a memory 234. Memory 234 stores computer readable instructions executable by processor 230, including a conventional web browser application 238. When processor 230 executes the instructions of web browser application 238, auxiliary computing device 124 is configured to request and receive web pages from servers connected to network 108, and to process instructions contained in those web pages.

Auxiliary computing device 124 also includes input devices interconnected with processor 230, including a keyboard 242. Auxiliary computing device 124 can also include other input devices, such as any suitable combination of a mouse, a remote control, a touchpad, a touch screen, and the like. Auxiliary computing device 124 also includes output devices interconnected with processor 230, including a display 246. Other output devices can also be provided, such as a speaker (not shown). Auxiliary computing device 124 also includes a network interface 250 interconnected with processor 230, which allows auxiliary computing device 124 to connect to network 108 via link 128. Network interface 250 thus includes the necessary hardware, such as network interface controllers and the like, to communicate over link 128.

Messaging server 116 includes a processor 260 interconnected with a memory 262. Memory 262 stores computer readable instructions executable by processor 260, including a routing application 264. When processor 260 executes the instructions of routing application 264, messaging server 116 is configured to perform various functions related to routing messages between mobile computing devices 104 and replicating the functionality of messaging application 208 on auxiliary computing device 124.

Messaging server 116 stores a routing database 266 containing associations between addressee identifiers and unique identifiers of destinations. Messaging server 116 also includes a network interface 268 interconnected with processor 260, which allows messaging server 116 to connect to network 108 via link 118. Network interface 268 thus includes the necessary hardware, such as network interface controllers and the like, to communicate over link 118.

Web/authentication server 132 includes a processor 270 interconnected with a memory 272. Memory 272 stores computer readable instructions executable by processor 270, including a web server application 274 and an authentication application 276. When processor 270 executes the instructions of web server application 274 and authentication application 276, server 132 is configured to perform various functions related to responding to web session requests and creating an association between mobile computing device 104-1 and auxiliary computing device 124. Server 132 also includes a network interface 278 interconnected with processor 270, which allows server 132 to connect to network 108 via link 136. Network interface 278 thus includes the necessary hardware, such as network interface controllers and the like, to communicate over link 136.

Figure 3:
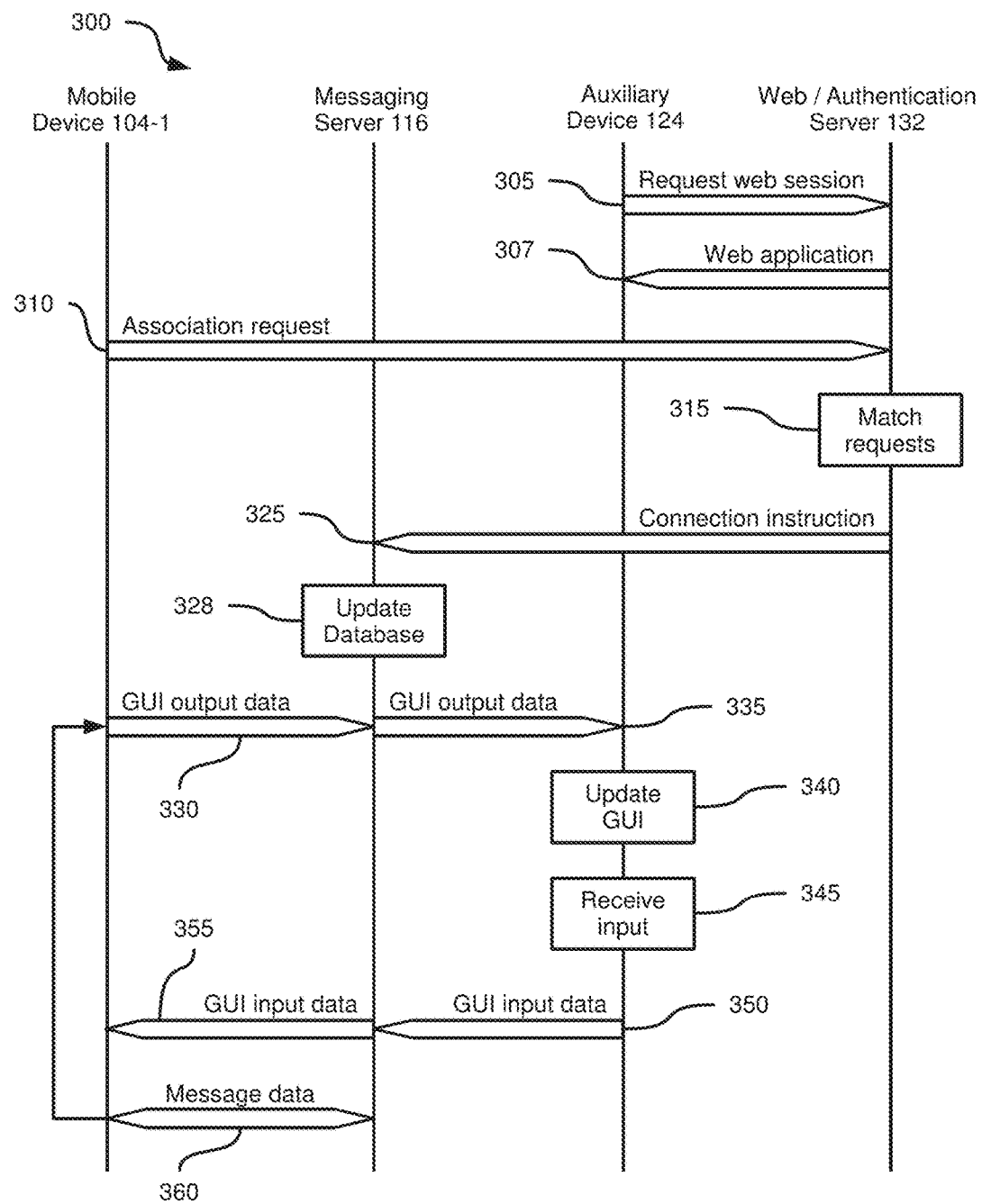
FIG. 3 depicts a method for replicating a communication application on the auxiliary computing device of FIG. 1, according to a non-limiting embodiment.

Referring now to FIG. 3, a method 300 of replicating application functionality on an auxiliary computing device is illustrated. Method 300 will be described in connection with its performance on system 100, to replicate the functionality of application 208 on auxiliary computing device 124. It will be apparent to those skilled in the art, however, that method 300 can also be performed in variations of system 100 to replicate the functionality of other applications executed by mobile computing devices 104.

Beginning at step 305, auxiliary computing device 124, executing web browser application 238, requests a web session with server 132. The web session request is received by server 132 (via execution of web server application 274) and stored in memory 272. At step 307, server 132 is configured to send a web application to auxiliary computing device 124. The web application can be, for example, a JavaScript application embedded in a web page provided to auxiliary computing device 124 in response to the request at step 305. As a result, auxiliary computing device 124 is configured, via the execution of its browser application 238, to execute the web application. The functionality of the web application will be detailed below.

At step 310, mobile computing device 104-1, executing messaging application 208, sends an association request to server 132, which receives the association request and stores the association request in memory 272. The nature of the association request is not particularly limited, but generally allows server 132 to identify mobile computing device 104-1 and to match the association request with the web session request of step 305. In other words, the requests at steps 305 and 310 signal to server 132 that mobile device 104-1 and auxiliary device 124 both wish to create an association between them in order to replicate messaging application 208 on auxiliary computing device 124.

At step 315, server 132, executing authentication application 276, matches the requests received at steps 305 and 310. Other validation steps can also be carried out, but are not required. In general, server 132 is configured to match the web session request and the association request. If the association request received at step 310 matches an earlier web session request, the matching is successful. If the association request does not match any web session requests stored in memory 272, the matching fails and server 132 is configured to return an error message (not shown) to mobile device 104-1.

Figure 4:
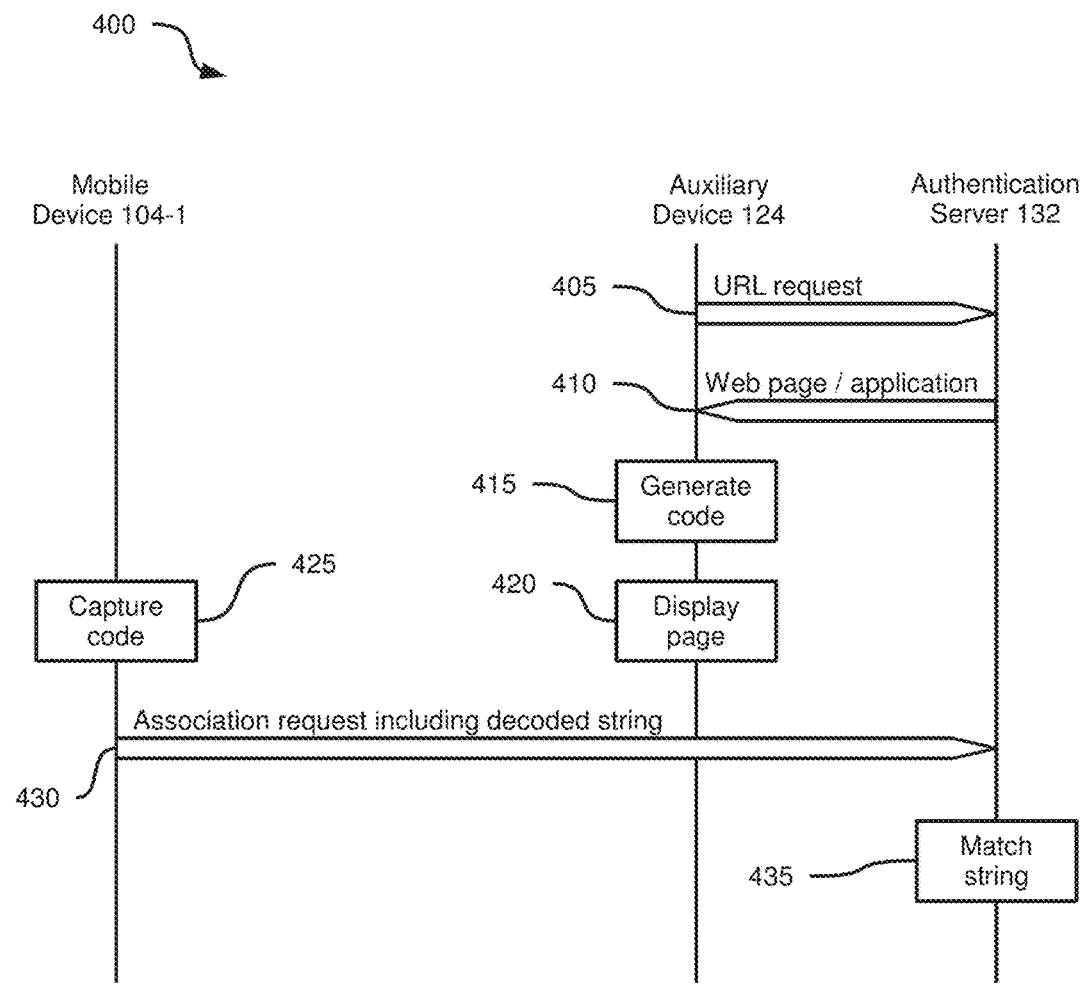
FIG. 4 depicts a method of initiating the replication of FIG. 3, according to a non-limiting embodiment.

Turning briefly to FIG. 4, a particular example of the requests and their matching at steps 305-315 is illustrated as a method 400 of initiating replication of an application. Messaging server 116 is omitted from FIG. 4, as in the present example messaging server 116 is not involved in the requests and matching represented by steps 305-315.

At step 405, auxiliary computing device 124, executing web browser application 238, sends a request (such as an HTTP request) for a predefined URL to server 132. Upon receipt of the request, at step 410 server 132, executing authentication application 276, returns a web page to auxiliary computing device 124 in response to the URL request of step 405. The web page includes the web application mentioned above in connection with step 307. At step 415, executing the web application, auxiliary computing device 124 generates an authentication code. The nature of the code is not particularly limited, but the code is unique in that it is distinct from any codes generated by other auxiliary computing devices. In the present example, the code is a OR code containing a string of characters (numerical or other). The code can be sent by auxiliary computing device 124 back to server 132 for storage in memory 272 in connection with an identifier of auxiliary computing device 124 (such as an IP address).

Having generated the code, at block 420, auxiliary computing device 124 presents the web page on display 246, including the code generated at block 215. An example of the resulting interface on display 246 is shown in FIG. 5.

Figure 5:
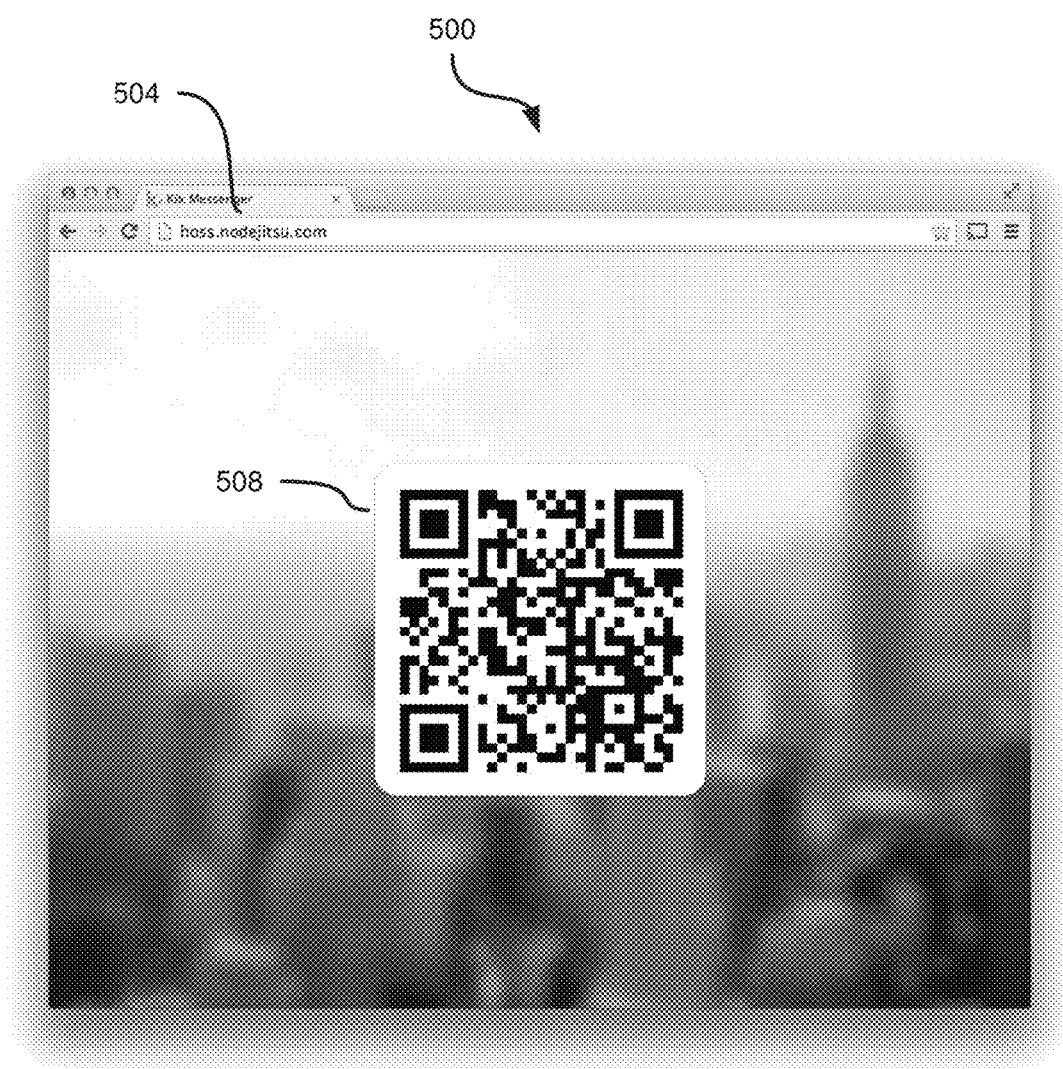
FIG. 5 depicts an interface generated by the auxiliary computing device of FIG. 1 during the performance of the method of FIG. 4, according to a non-limiting embodiment.

FIG. 5 depicts a browser window 500 presented on display 246 via the execution of browser application 238. Browser window 500 displays the URL 504 transmitted to server 132 at step 405, as well as the web page received from server 132, including the code 508 generated at block 420.

Figure 6:
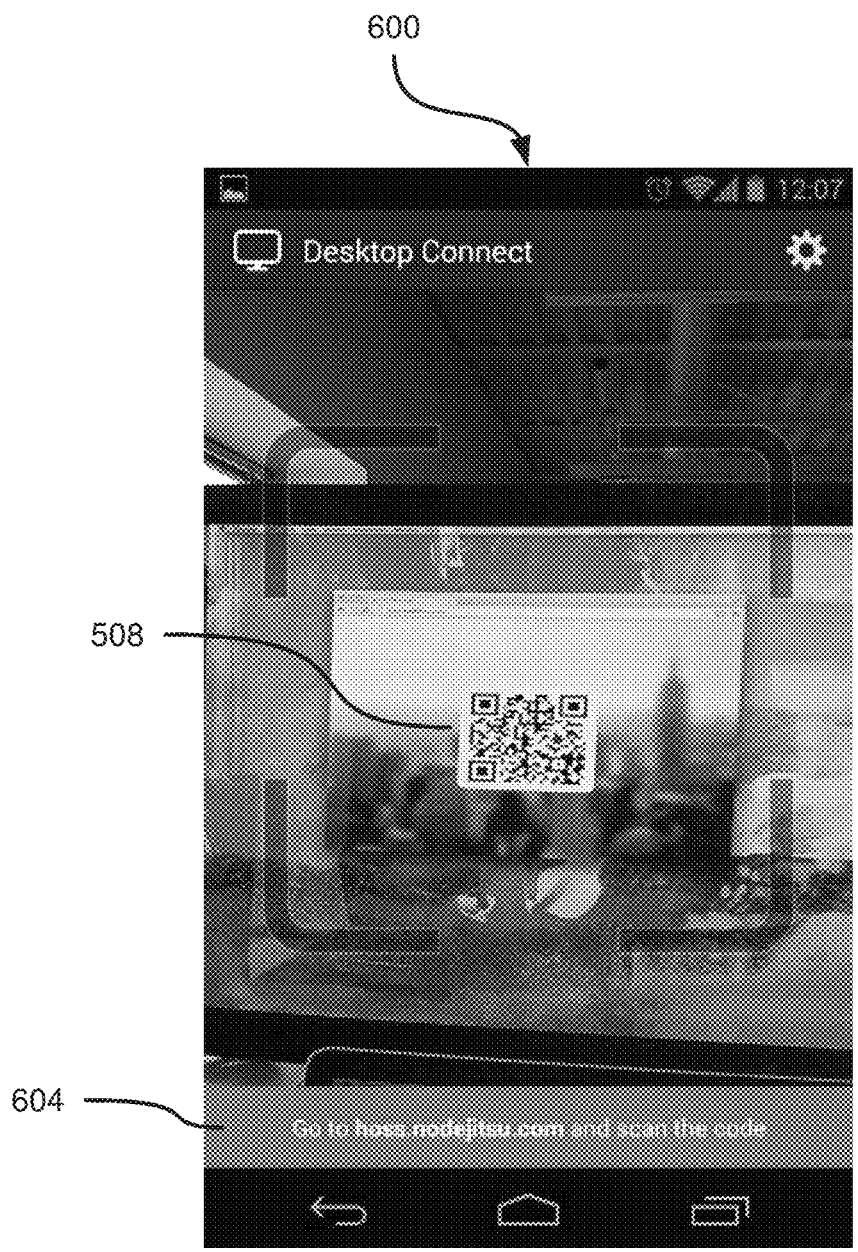
FIG. 6 depicts an interface generated by the mobile computing device of FIG. 1 during the performance of the method of FIG. 4, according to a non-limiting embodiment.

Returning to FIG. 4, at step 425 mobile computing device 104-1 is configured to capture an image of display 246, including code 508. In particular, processor 200 of mobile device 104-1 is configured to receive input from touch screen 212 instructing processor 200 to control camera 214 to capture an image. FIG. 6 shows an example of an interface presented on display 216 after receipt of the input activating camera 214, and before the actual capture of an image.

As seen in FIG. 6, mobile computing device 104-1 can present a window 600 including the field of view of camera 214 (in which code 508 is visible on display 246 of auxiliary computing device 124). In some examples, mobile computing device 104-1 can also present an indication 604 of the URL to be requested by auxiliary computing device 124.

Having presented window 600, mobile computing device 104-1 is configured to receive an input (for example, from touch screen 212) activating the shutter of camera 214. Mobile computing device 104-1 thus captures an image using camera 214 and stores the image in memory 204. Mobile computing device 104-1 is also configured to decode the string contained within code 508.

Returning again to FIG. 4, at step 430 mobile computing device 104-1 is configured to transmit the association request referred to in connection with step 310. The association request includes an identifier, such as an account name, IP address or the like, of mobile computing device 104-1. The association request also includes the string decoded from code 508.

At step 435, server 132 receives the association request and matches the string contained therein with the code received from auxiliary computing device 124 after step 410. In practice, server 132 may receive a large number of codes in response to a number of requests from different auxiliary computing devices. Thus, the performance of step 435 generally involves search memory 272 for a code matching the contents of the association request. If a match is found, an association will be created between mobile computing device 104-1 and the auxiliary computing device whose IP address (or other identifier) is stored in memory 272 in connection with the matching code.

Server 132 is also configured, at step 325, to send a connection instruction to messaging server 116. The connection instruction informs messaging server 116 of the successful association of mobile computing device 104-1 and auxiliary computing device 124, and thus includes identifiers of both those devices. Messaging server 116 receives the connection instruction and, at step 328, updates database 266 to store an identifier of mobile computing device 104-1 in connection with an identifier of auxiliary computing device 124. The nature of the identifiers is not particularly limited, and multiple identifiers of each device can be stored in database 266 in connection with each other. For example, at step 328 messaging server 116 can create or update a record in database 266 to include the account name associated with mobile computing device 104-1, the IP address of mobile computing device 104-1, and the IP address of auxiliary computing device 124.

Following the completion of step 328, an association has been established between mobile computing device 104-1 and auxiliary computing device 124. Messaging server 116 can send a message (not shown) to mobile computing device 104-1 confirming that the association has been established.

Figure 7:
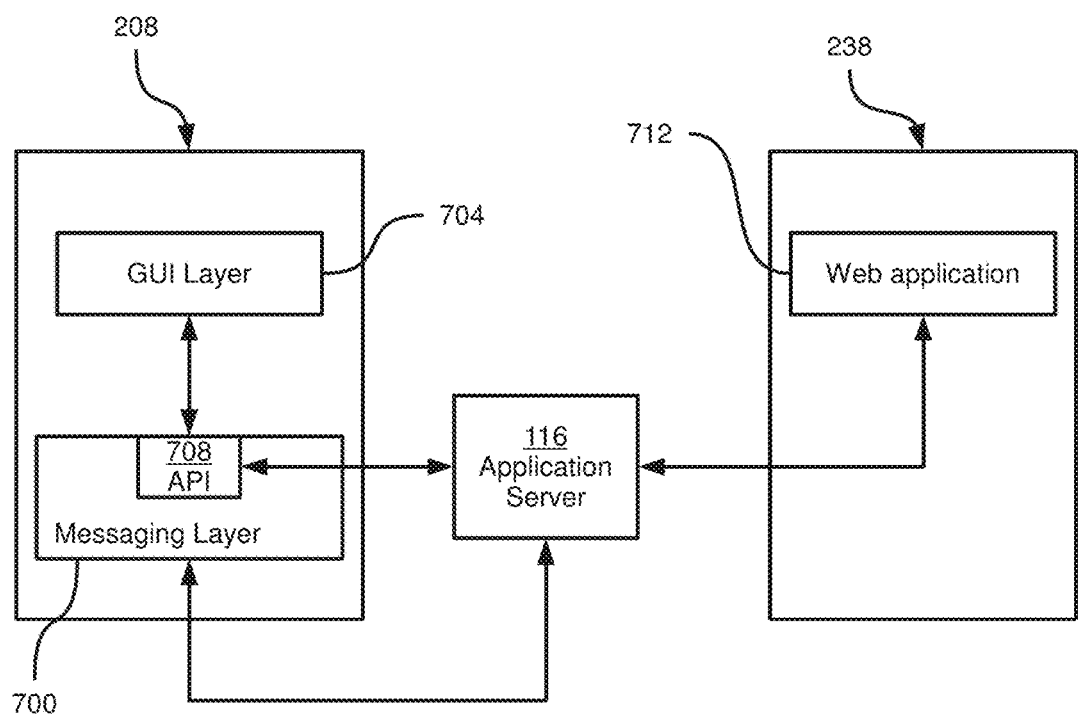
FIG. 7 depicts a schematic diagram of the messaging and web browser applications of FIG. 2, according to a non-limiting embodiment.

Once the association is established, mobile computing device 104-1, messaging server 116 and auxiliary computing device 124 are configured to interact to mirror the graphical user interface (GUI) of messaging application 208 on display 246. Referring briefly to FIG. 7, a diagram of messaging application 208 and browser application 238 is shown.

Messaging application 208 can have a messaging layer 700 and a GUI layer 704. Messaging layer 700 can configure processor 200 to receive, process and generate messages for communication with other mobile computing devices 104.

GUI layer 704, meanwhile, can configure processor 200 to control display 216 to present data received, processed and generated by messaging later 700. In addition, messaging layer can include an application programming interface (API) component 708 for communicating with GUI later 704. For example, API 708 can define the form and contents of instructions generated by messaging layer 700 for use by GUI layer 704 in controlling display 216.

Web browser application 238 is also shown in FIG. 7, and includes the above-mentioned web application 712, received from server 132 at step 307 of method 300. Web application 712 can configured processor 230 to mimic GUI layer 704 of messaging application 208. In other words, in regular use (that is, when no replication is being conducted), executing messaging application 208 on mobile computing device 104-1 causes messaging layer 700 to pass data to GUI layer 704 for drawing on display 216, and also causes GUI layer 704 to pass data representing user input to messaging layer 700 for further action (e.g. generation and transmission of a message to mobile computing device 104-2). When replication is being conducted following step 328 of method 300, web application 712 interacts with messaging layer 700 in substantially the same way as GUI layer 704. Messaging server 116 acts as an intermediary between messaging layer 700 and web application 712.

Returning to FIG. 3, at step 330 mobile computing device 104-1 is configured to transmit GUI output data to messaging server 116 for delivery to auxiliary computing device 124 at step 335. Steps 330 and 335 can be implemented in a variety of ways. For example, mobile computing device 104-1 can be configured to transmit GUI output data in a communication addressed to auxiliary device 124. In another example, mobile computing device 104-1 can be configured to transmit the GUI output data without an address, and messaging server 116 can be configured to determine, based on the updated contents of database 266 and on the nature of the GUI output data, that the GUI output data should be forwarded to auxiliary computing device 124. Other implementations will also occur to those skilled in the art.

Figure 8:
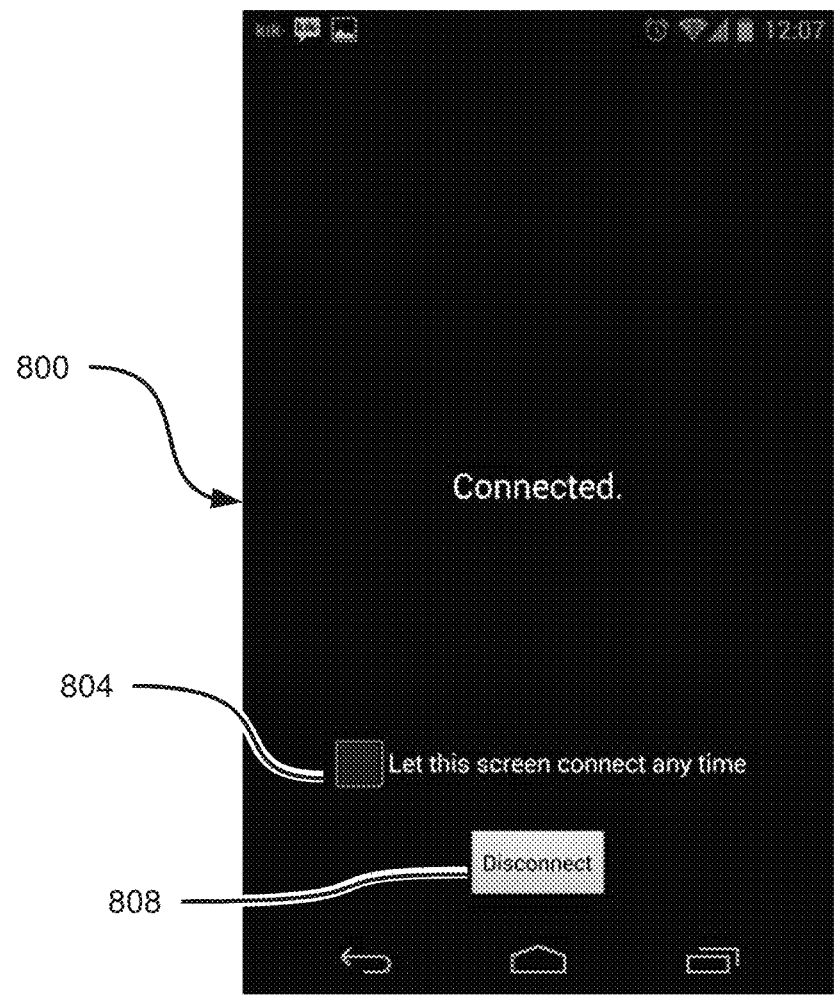
FIG. 8 depicts an interface generated by the mobile computing device of FIG. 1 during the performance of the method of FIG. 3, according to a non-limiting embodiment.

It is also contemplated that prior to the performance of step 330, mobile computing device 104-1 can be configured to at least partially disable GUI layer 704. Referring to FIG. 8, a window 800 is presented on display 216 as a result of the execution of messaging application 208 after replication with auxiliary computing device 124 begins. Window 800 contains an indication that replication is ongoing ("connected"), but does not display any message data, contact data, or other GUI elements normally displayed by messaging application 208. Window 800 also includes an automatic connection setting 804, and a selectable disconnect element 808, which will be discussed later herein. Although FIG. 8 illustrates the partial disabling of GUI layer 704, in other embodiments GUI layer 704 can remain active.

Figure 9:
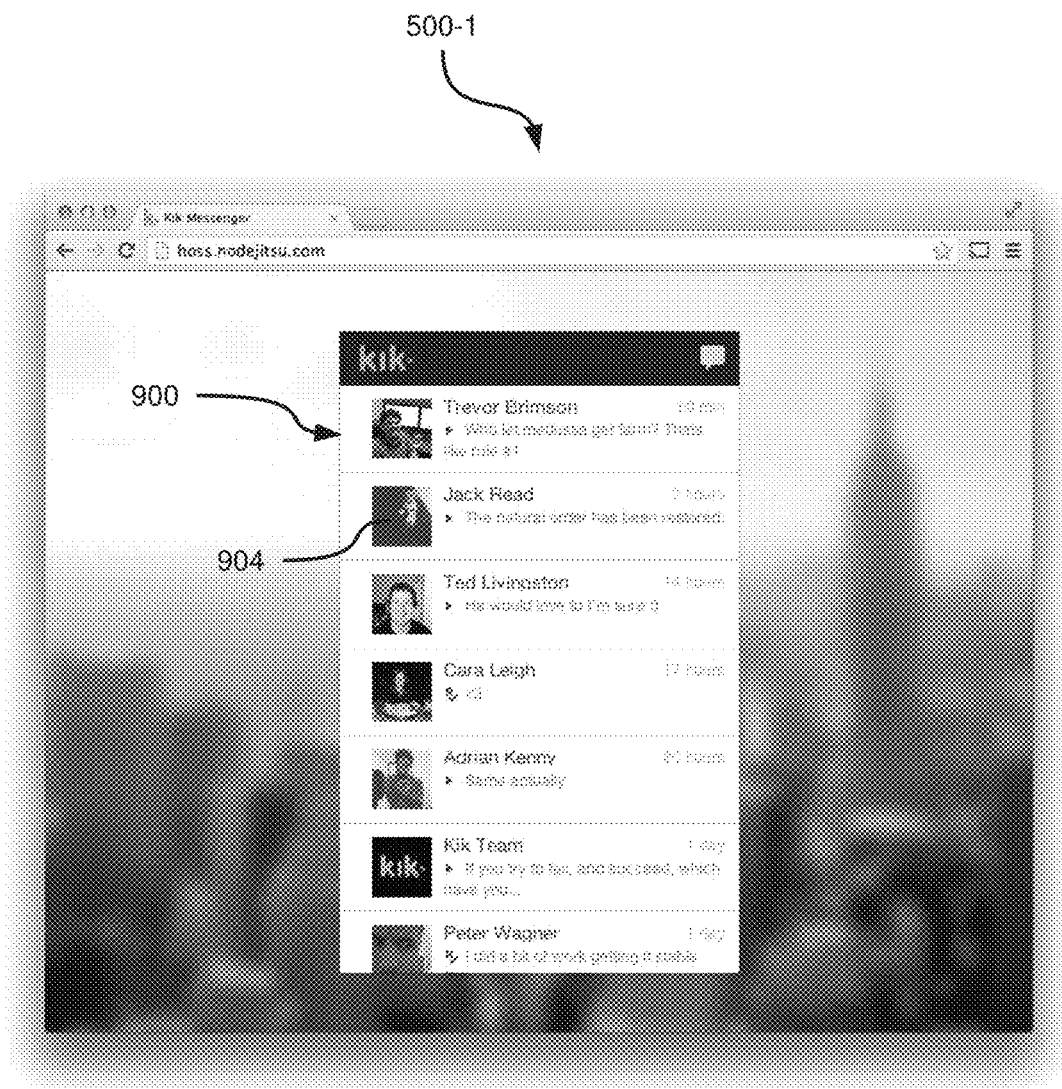
FIG. 9 depicts an interface replicated at the auxiliary computing device of FIG. 1, according to a non-limiting embodiment.
Figure 10:
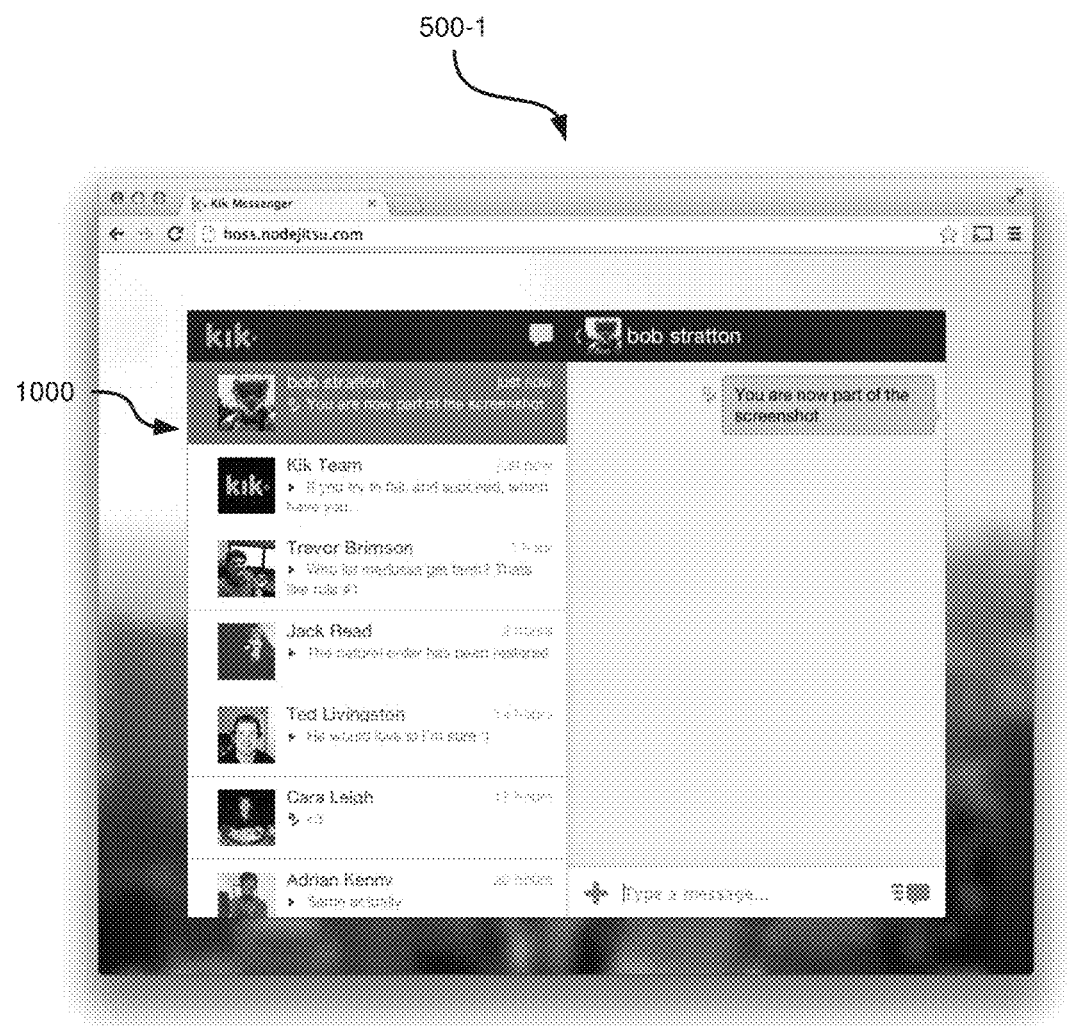
FIG. 10 depicts another interface replicated at the auxiliary computing device of FIG. 1, according to a non-limiting embodiment.

Referring again to FIG. 3, at step 340 auxiliary computing device 124 is configured to present an updated GUI within web browser application 238, via execution of web application 712, using the GUI output data received from messaging server 116. FIG. 9 shows an updated version 500-1 of browser window 500 shown in FIG. 5. Window 500-1 includes a messaging interface 900 that corresponds to the interface generated on mobile computing device 104-1 by GUI layer 704 when replication is not ongoing. Messaging interface 900 includes identifiers 904 of various other accounts (associated with other mobile computing devices 104), each of which is selectable to cause the display of recently exchanged messages with the selected account. It is contemplated that messaging interface 900 need not be identical to a messaging interface presented at mobile computing device 104-1. For example, FIG. 10 shows another example messaging interface 1000 which is similar to messaging interface 900 but occupies a greater portion of available display space on display 246 (which is greater, in this example, than the space available on display 216). Thus, web application 712 need not be an exact replica of GUI layer 704.

At step 345, auxiliary computing device 124 is configured to receive input from, for example, keyboard 242 in connection with messaging interface 900. Such input can be a selection of an account identifier 904, the composition of a message, and the like. Following the receipt of input, auxiliary computing device 124 is configured to generate GUI input data according to the format dictated by API 708. In other words, the GUI input data generated at auxiliary computing device 124 is similar, or identical, to data that would be generated by GUI layer 704 if similar input were received at mobile computing device 104-1.

At step 350, auxiliary computing device 124 is configured to transmit the GUI input data to messaging server 116, for delivery to mobile computing device 104-1 at step 355. As with steps 330 and 335, the exact implementation of steps 350 and 355 is not particularly limited. In some examples, auxiliary computing device 124 can explicitly address the GUI input data to mobile computing device 104-1, while in other examples it can be left to messaging server 116 to determine, based on database 266, where to send the GUI input data.

Following receipt of the GUI input data at mobile computing device 104-1, the GUI input data is processed (specifically, by execution of messaging layer 700) and mobile computing device 104-1 can exchange message data with messaging server 116. Depending on the nature of the GUI input data, mobile computing device 104-1 can be configured to generate message data for delivery to another mobile computing device and send the message data at step 360. Mobile computing device 104-1 can then return to step 330 and send further GUI output data (for example, to inform web application 712 that the message has been sent). On the other hand, if the GUI input data requires only additional GUI output data in response, mobile computing device 104-1 returns to step 330 without performing step 360.

It will be apparent from the above that message data can also be received, unsolicited, at mobile computing device 104-1 from messaging server 116. For example, when mobile computing device 104-2 sends a message addressed to mobile computing device 104-1, messaging server 116 transmits the message to mobile computing device 104-1 at step 360. Upon receipt of the message data, mobile computing device 104-1 is configured to generate updated GUI output data, and transmit the GUI output data to messaging server 116 at step 330.

It will also be apparent from the discussion above that GUI input data and GUI output data can overlap with message data, in that the contents of messages sent and received at mobile computing device 104-1 will be provided to auxiliary computing device 124 for display. However, when provided to auxiliary computing device 124, such data is nevertheless referred to as GUI input or output data, as it is formatted in accordance with the requirements of API 708.

To summarize, once the connection between mobile computing device 104-1 and auxiliary computing device 124, messaging server 116 is configured to route application control data (that is, GUI output data for controlling display 246 and GUI input data for causing various actions to be taken by messaging application 208) between mobile computing device 104-1 and auxiliary computing device 124, and to route message data between mobile computing device 104-1 and other mobile computing devices 104. Mobile computing device 104-1, for its part, is configured to direct GUI output data to messaging server 116 rather than GUI layer 704, and otherwise to generate GUI output data, process GUI input data, and process message data as it would if no replication were being conducted.

The performance of steps 330-360 can be repeated for as long as replication is desirable. In order to terminate replication of messaging application 208 on auxiliary computing device 104-1, input selecting disconnection element 808 on mobile computing device 104-1 can be provided to processor 200. Selection of element 808 causes mobile computing device to transmit a message to messaging server 116 to either delete or retain but deactivate (for instance, via a bit flag in database 266) the association stored at step 328. After sending the deactivation message, mobile computing device 104-1 can reactivate or fully re-enable GUI layer 704, and cease sending GUI output data to messaging server 116. In some examples, messaging server 116 can also send an instruction to auxiliary computing device 124 to cease execution of web application 712.

Connection and disconnection (that is, starting and stopping of replication functionality) can be carried out automatically in some examples. Mobile computing device 104-1 can be configured to monitor its geographic location, whether by use of a GPS receiver, triangulation from cellular network elements, or the presence of certain networks identified in memory 204. For example, memory 204 can store a specific Wi-Fi network, which is known to be in close geographical proximity to auxiliary computing device 124. The presence or absence of a broadcast identifier (e.g. SSID) of that network can be used by mobile computing device 104-1 to initiate or disconnect replication.

More specifically, upon detecting the broadcast identifier of the known network, mobile computing device 104-1 can automatically transmit an association request as in step 310 to initiate replication. Later, if mobile computing device 104-1 detects that it is no longer within range of the Wi-Fi network (because the broadcast identifier is no longer detectable), mobile computing device 104-1 can automatically select disconnection element 808.

Variations to the above are also contemplated. For example, messaging server 116 and server 132 can be co-located, or even combined into a single server. In other embodiments, web server application 274 and authentication application 276 need not both be executed by server 132. For example, server 132 may execute only web server application 274, and authentication functionality obtained by the execution of authentication application 276 can be relocated to messaging server 116. In other words, the functionality provided by the three server applications—routing application 264, web server application 274 and authentication application 276—can be arranged at one or more servers in any of a variety of combinations.

In some variations, the connections between mobile device 104-1 and messaging server 116, and between messaging server 116 and auxiliary device 124 (or indeed any other devices) can be encrypted.

In another variation, communications between mobile device 104-1 and auxiliary device 124 can be encrypted end-to-end such that no intermediate element (including messaging server 116) can view the content of those communications. In this variation, messaging server 116 does not maintain persistent associations between addressee identifiers and unique device identifiers as in database 266 mentioned above. Instead, messaging server 116 maintains only session-specific associations.

Figure 11:
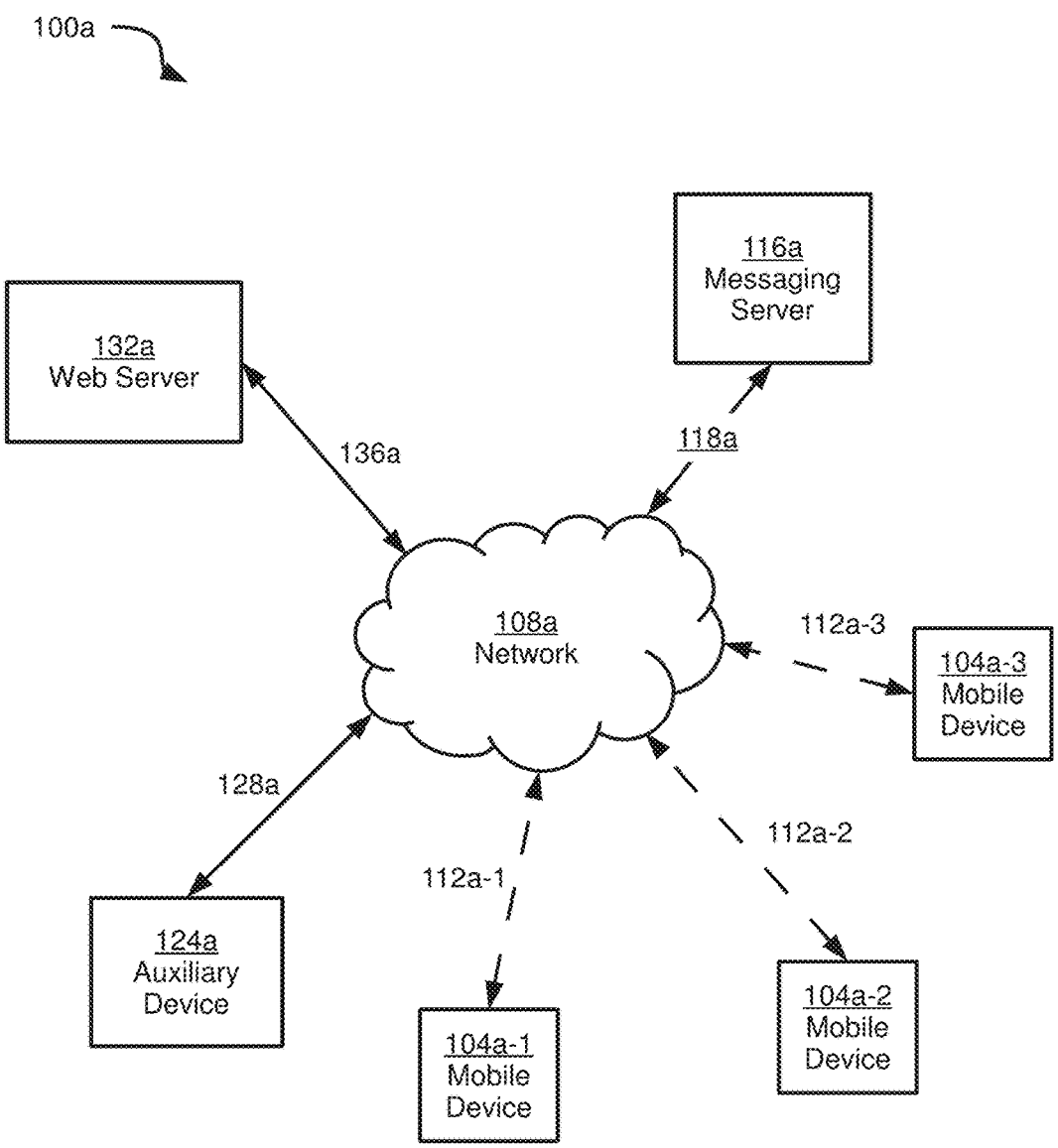
FIG. 11 depicts communications system, according to a further non-limiting embodiment.

FIG. 11 depicts a variation 100*a* of system 100, used for end-to-end encryption. Components of system 100*a* are numbered similarly to their counterparts in system 100, with the suffix "a" added. Except where noted below, the components of system 100*a* are as described above in connection with their counterparts in system 100.

System 100*a* thus includes mobile devices 104*a*-1, 104*a*-2, and 104*a*-3 as well as an auxiliary device 124*a*, all linked by a network 108*a* via respective links 112*a*-1, 112*a*-2, 112*a*-3 and 128*a*. In addition, system 100*a* includes a messaging server 116*a*. Messaging server 116*a* executes a routing application as discussed above, but does not maintain database 266. Messaging server 116*a* can, however, store session-based data tracking current connections.

System 100*a* also includes a web server 132*a*. Of note, server 132*a* is not a web server and an authentication server; system 100*a* has no analogue to authentication application 276. Rather, mobile device 104*a*-1 and auxiliary device 124*a* themselves handle authentication and connection setup, as will be discussed below.

Figure 12:
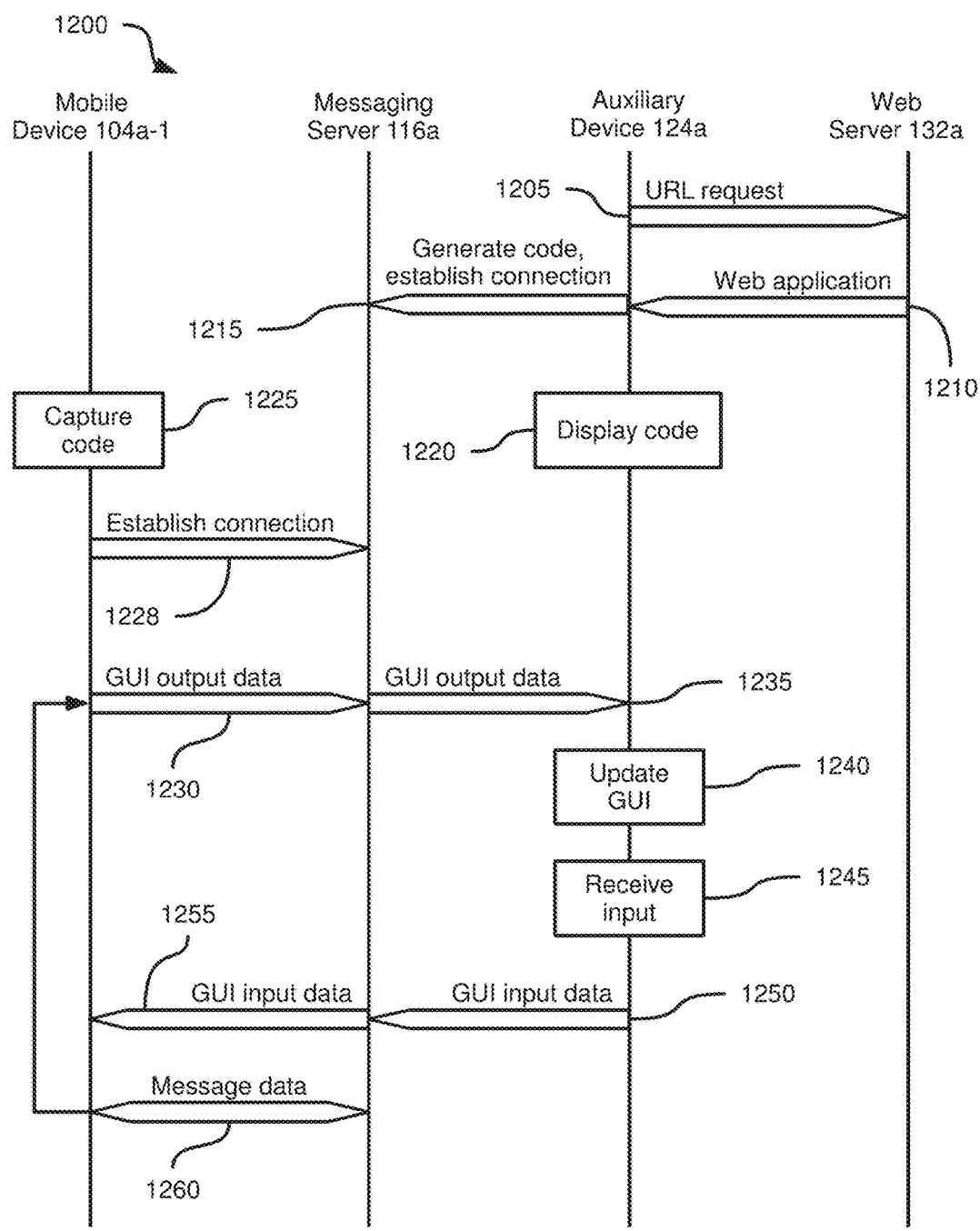
FIG. 12 depicts a method for replicating a communication application on the auxiliary computing device of FIG. 11, according to another non-limiting embodiment.

FIG. 12 depicts a method 1200 of replicating application functionality on auxiliary computing device 124*a* using an end-to-end encrypted connection between mobile computing device 104*a*-1 and auxiliary computing device 124*a*. At block 1205, auxiliary computing device 124*a*, executing web browser application 238, sends a request (such as an HTTP request) for a predefined URL to web server 132*a*, as described in connection with block 305 of FIG. 3 and block 405 of FIG. 4. At block 1210, in response to the request, web server 132*a* sends a web application to auxiliary computing device 124*a*, as described above in connection with block 307 of FIG. 3. As noted above, server 132*a* does not perform any authentication functions in this variation. Instead, web server 132*a* simply acts as a web server hosting the web application.

In this variation, auxiliary computing device 124*a* possesses one or more asymmetric encryption key pairs. The key pairs can be retrieved from memory 234 (having been generated at auxiliary device 124*a* for an earlier session) or can be newly generated after the receipt of the web application. At block 1215, auxiliary computing device 124*a* generates a code, and establishes a connection with messaging server 116*a*. The code can be, for example, a fingerprint of the public key of auxiliary computing device 124*a*, and the connection established with messaging server 116*a* can therefore be identified with that fingerprint.

At block 1220, auxiliary computing device 124*a* displays the code generated at block 1215 and used to establish the connection with messaging server 116*a*. For example, the fingerprint can be displayed by encoding it in a OR code or other graphical identifier. Auxiliary computing device 124*a* displays the code for capture and decoding by mobile computing device 104*a*-1 at block 1225 as described above in connection with block 425 of FIG. 4. In some examples, the displayed code can also encode an address (or other identifier) of messaging server 116*a* obtained at block 1215 during the establishment of the connection. The inclusion of the address of messaging server 116*a* can be useful when multiple messaging servers exist for load balancing purposes, to ensure that auxiliary computing device 124*a* and mobile device 104*a*-1 both contact the same messaging server 116*a*. This is not mandatory, but can reduce the computational load required to shift connections between different messaging servers.

Once mobile computing device 104*a*-1 has captured the code displayed by auxiliary computing device 124*a*, mobile computing device 104*a*-1 establishes a connection with messaging server 116*a* at block 1228. For example, mobile computing device 104*a*-1 can send a message to messaging server 116*a* that includes the fingerprint decoded from the OR code displayed by auxiliary computing device 124*a*. Messaging server 116*a*, having already received a connection request from auxiliary computing device 124*a* using that same fingerprint, can thus route the message sent at block 1228 to auxiliary computing device 124*a*, thus establishing a session between mobile computing device 104*a*-1 and auxiliary computing device 124*a*.

Once a connection has been established between mobile device 104*a*-1 and auxiliary computing device 124*a*, via messaging server 116*a*, mobile device 104*a*-1 and auxiliary computing device 124*a* can exchange encryption keys as necessary to set up an end-to-end encrypted connection. For example, mobile device 104*a*-1 and auxiliary computing device 124*a* can generate and exchange a symmetric encryption key that will be used to encrypt the contents of messages containing GUI input and output data. Various key exchange algorithms can be used (e.g. ElGamal, Diffie-Hellman, signed public key exchange and the like). More generally, any procedure can be used to set up the encrypted connection that makes use of the information shared out of band between mobile device 104*a*-1 and auxiliary device 124*a* (that is, the public key fingerprint displayed by auxiliary computing device 124*a*, or other shared information, such as a shared password in the case of the Diffie-Hellman algorithm). Use of the fingerprint or other information shared out of band hardens the connection setup against man-in-the-middle attacks.

Following the creation of an end-to-end encrypted connection between mobile device 104*a*-1 and auxiliary computing device 124*a*, the exchange of GUI input data, GUI output data, and message data proceeds at blocks 1230, 1235, 1240, 1245, 1250, 1255 and 1260 substantially as described above in connection with blocks 330, 335, 340, 345, 350, 355 and 360 respectively. Each message exchanged between auxiliary computing device 124*a* and mobile computing device 104*a*-1 is routed via messaging server 116*a*, although messaging server 116*a* will be unable to inspect the body of any such message.

In another variation, messaging server 116 can determine (for example, based on the IP addresses associated with auxiliary computing device 124 and mobile computing device 104-1, that auxiliary computing device 124 and mobile computing device 104-1 appear to be on the same local network. Messaging server 116 can be configured to inform one or both devices of that fact, following which either or both of auxiliary computing device 124 and mobile computing device 104-1 can be configured to attempt to establish a local encrypted connection with each other, bypassing messaging server 116. In still another variation, either or both of mobile device 104-1 and auxiliary device 124 can be configured to attempt to contact one another directly on a local network. If both devices are in fact on the same local network, GUI input and output data can be transmitted between the devices without the involvement of messaging server 116.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

I claim:

1. A method in a server, comprising:
    transmitting a web application to an auxiliary computing device;
    receiving a first connection request from the auxiliary computing device, the first connection request including a unique identifier associated with the web application;
    receiving a second connection request from a mobile computing device executing a communication application, the second connection request including the unique identifier and one or more encryption keys for establishing an encrypted connection between the auxiliary computing device and the mobile computing device, the encrypted connection being distinct from a messaging connection between the mobile computing device and another computing device established via the server; and
    upon receipt of the first and second connection requests, receiving first encrypted data from the mobile device and routing the first encrypted data to the auxiliary computing device via the encrypted connection;
    responsive to routing the first encrypted data, receiving second encrypted data from the auxiliary computing device and routing the second encrypted data to the mobile computing device via the encrypted connection;
    responsive to routing the second encrypted data, receiving outgoing message data from the mobile computing device defining a message addressed to the other computing device, and routing the message to the other computing device via the messaging connection.

2. The method of claim 1, wherein the unique identifier is a fingerprint of a public encryption key associated with the web application.

3. The method of claim 2, the unique identifier being provided to the mobile computing device for inclusion in the second connection request by being presented on a display of the auxiliary computing device.

4. The method of claim 1, wherein the first encrypted data and the second encrypted data are encrypted such that they cannot be decrypted by the server.

5. The method of claim 1, wherein the first encrypted data and the second encrypted data include application control data routed between the auxiliary computing device and the mobile computing device.

6. The method of claim 5, wherein the first encrypted data includes application control data for updating a graphical user interface generated by the auxiliary computing device; and
    wherein the second encrypted data includes application control data representing input to the graphical user interface received at the auxiliary computing device, the input defining the message data.

7. The method of claim 6, wherein the graphical user interface substantially replicates an interface of the communication application.

8. A system, comprising:
    a web server configured to transmit a web application to an auxiliary computing device; and
    a messaging server configured to:
        receive a first connection request from the auxiliary computing device, the first connection request including a unique identifier associated with the web application;
        receive a second connection request from a mobile computing device executing a communication application, the second connection request including the unique identifier and one or more encryption keys for establishing an encrypted connection between the auxiliary computing device and the mobile computing device, the encrypted connection being distinct from a messaging connection between the mobile computing device and another computing device established via the server; and
        upon receipt of the first and second connection requests, receive first encrypted data from the mobile device and routing the first encrypted data to the auxiliary computing device via the encrypted connection;
        responsive to routing the first encrypted data, receive second encrypted data from the auxiliary computing device and routing the second encrypted data to the mobile computing device via the encrypted connection;
        responsive to routing the second encrypted data, receive outgoing message data from the mobile computing device defining a message addressed to the other computing device, and route the message to the other computing device via the messaging connection.

9. The system of claim 8, wherein the unique identifier is a fingerprint of a public encryption key associated with the web application.

10. The system of claim 9, the unique identifier being provided to the mobile computing device for inclusion in the second connection request by being presented on a display of the auxiliary computing device.

11. The system of claim 8, wherein the first encrypted data and the second encrypted data are encrypted such that they cannot be decrypted by the messaging server.

12. The system of claim 8, wherein the first encrypted data and the second encrypted data include application control data routed between the auxiliary computing device and the mobile computing device.

13. The system of claim 12, wherein the first encrypted data includes application control data for updating a graphical user interface generated by the auxiliary computing device; and
    wherein the second encrypted data includes application control data representing input to the graphical user interface received at the auxiliary computing device, the input defining the message data.

14. The system of claim 13, wherein the graphical user interface substantially replicates an interface of the communication application.

* * * * *